(12) United States Patent
Message et al.

(10) Patent No.: US 6,595,693 B1
(45) Date of Patent: Jul. 22, 2003

(54) INSTRUMENTED BEARING

(75) Inventors: Olivier Message, Tours (FR); Franck Landrieve, Fondettes (FR)

(73) Assignee: SKF France, Montigny le Bretonneux (FR)

( * ) Notice: Subject to any disclaimer, the term of this patent is extended or adjusted under 35 U.S.C. 154(b) by 0 days.

(21) Appl. No.: 10/030,968

(22) PCT Filed: Jul. 11, 2000

(86) PCT No.: PCT/FR00/01999

§ 371 (c)(1),
(2), (4) Date: Jan. 15, 2002

(87) PCT Pub. No.: WO01/07922

PCT Pub. Date: Feb. 1, 2001

(30) Foreign Application Priority Data

Jul. 23, 1999 (FR) ............................................ 99 09610

(51) Int. Cl.⁷ .............................................. F16C 32/00
(52) U.S. Cl. ....................................... 384/448; 324/174
(58) Field of Search .......................... 384/448; 324/173, 324/174, 207.25

(56) References Cited

U.S. PATENT DOCUMENTS

| | | |
|---|---|---|
| 4,746,862 A | 5/1988 | Ueki |
| 5,564,839 A | 10/1996 | Ouchi et al. |
| 5,757,084 A | 5/1998 | Wagner |
| 5,927,867 A * | 7/1999 | Niebling et al. ............ 384/448 |
| 5,997,103 A | 12/1999 | Wagner |
| 6,007,253 A * | 12/1999 | Rutter ........................ 384/539 |
| 6,043,643 A | 3/2000 | Message et al. |
| 6,094,046 A * | 7/2000 | Message et al. ............ 324/173 |

FOREIGN PATENT DOCUMENTS

FR 2 754 903 4/1998

\* cited by examiner

*Primary Examiner*—Thomas R. Hannon
(74) *Attorney, Agent, or Firm*—Smith, Gambrell & Russell

(57) ABSTRACT

The invention concerns an instrumented bearing (1) comprising an outer ring (2), an inner ring (4), at least a row of rolling elements (6) arranged between a raceway of the outer ring (2) and a raceway of the inner ring (4), an assembly detecting rotation parameters comprising a sensor unit (11) integral with the non-rotating ring and supporting a sensing element (14) and a rotating coding member (16) forming a rotating part with the rotating ring, the coding member comprising an active part moving in rotation in front of the sensing element, the sensing unit and the non-rotating ring forming a fixed part. The rotating part comprises indexing means external to the active part of the coding element and capable of positioning at an angle said rotating part relative to a reference of the fixed part in a position wherein the coder generates in the sensing element a reference signal.

11 Claims, 6 Drawing Sheets

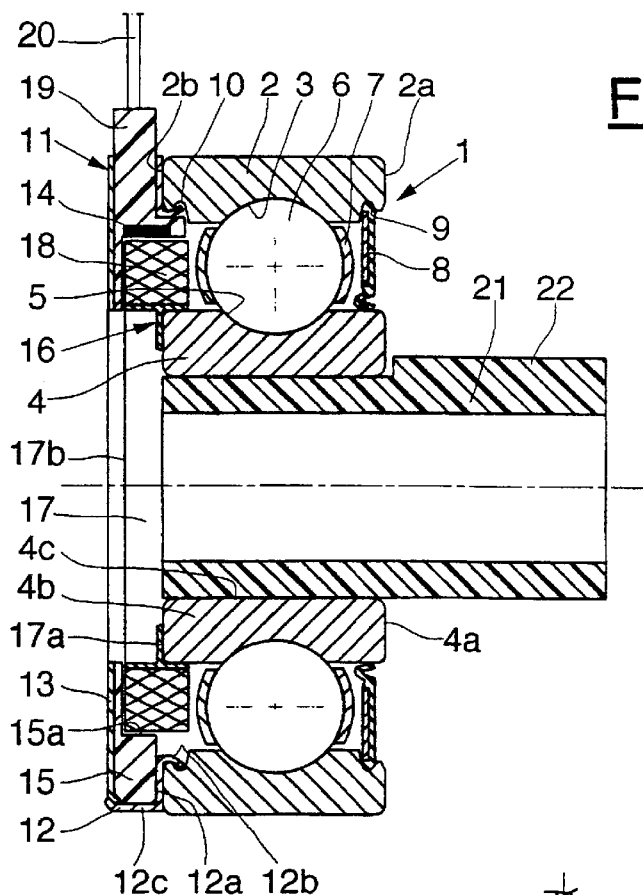
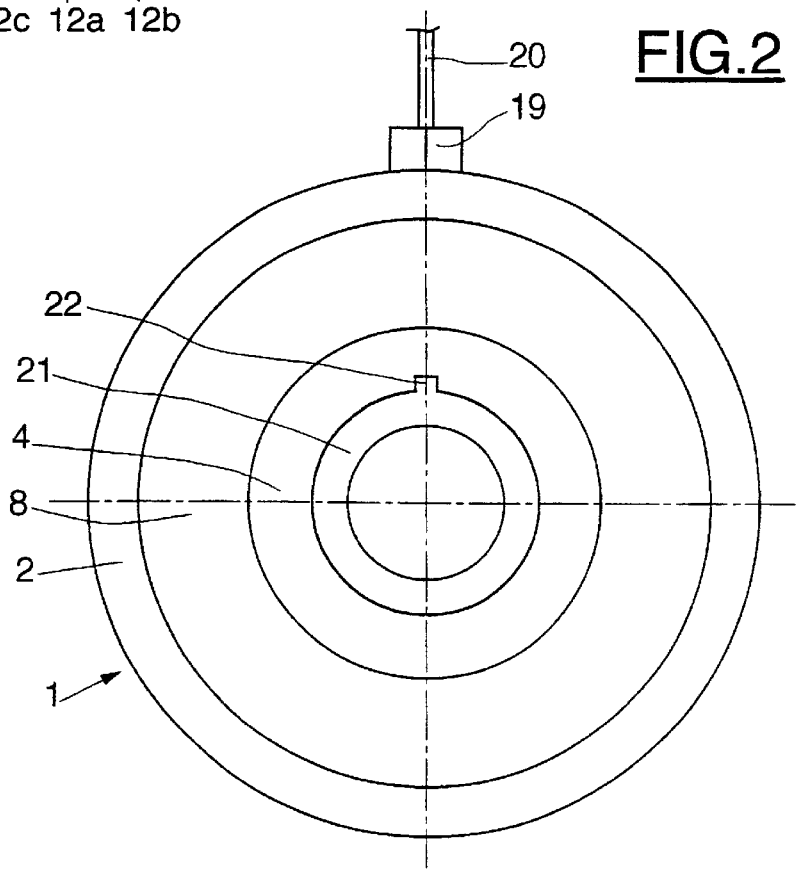

INSTRUMENTED BEARING

The present invention relates to the field of instrumented rolling bearings equipped with an assembly for detecting rotation parameters such as the angular position, the direction of rotation, the speed and the acceleration.

Such instrumented rolling bearings and such set-ups are well known, particularly from document FR 2 754 903. These instrumented rolling bearings can be used, for example, for controlling electric motors of the synchronous type.

The detection assembly consisting of a sensor unit and an encoder element then supplies the motor control system with all the information it needs, particularly the rotational speed and the position of the poles of the rotor with respect to those of the stator. The rotor may be equipped with an encoder delivering pulses and the stator may be equipped with a stationary sensor capable of detecting these pulses and of deducing them from the information that relates to the movement and to the angular position of the rotor with respect to the stator. In conventional set-ups, the sensor-encoder system is independent of the rolling bearings via which the rotor rotates in the stator concentrically with the latter.

In a way known per se, the encoder may be of the magnetic type, and may be in the form of a multipole ring, the number of poles of which depends on the number of poles of the motor that is to be controlled. The encoder may collaborate with a sensor of the type sensitive to magnetism, for example a Hall-effect probe, delivering an output voltage that varies each time the polarity of the encoder ring changes, and thus delivering a characteristic signal of the square-wave type.

If there is a desire to determine the position of the poles of the rotor with respect to those of the stator using the instrumented rolling bearing, it will be appreciated that it is necessary, when mounting the rotor in the stator, for:
  the sensor to be oriented angularly with respect to the poles of the stator,
  the encoder to be oriented angularly with respect to the sensor,
  the encoder to be oriented angularly with respect to the poles of the rotor.

These operations are relatively tricky to perform in that they need to be carried out simultaneously while the rotor is being mounted in the stator.

The invention proposes an instrumented rolling-bearing device arranged in place of one of the two rolling bearings, thus avoiding the mounting of a separate sensor-encoder assembly in the motor, the rolling-bearing device being pre-indexed so as to eliminate the operation of indexing the encoder with respect to the sensor when assembling the motor.

The instrumented rolling-bearing device, according to one aspect of the invention, is of the type comprising an outer ring, an inner ring, at least one row of rolling elements which are arranged between a raceway of the outer ring and a raceway of the inner ring, and an assembly for detecting rotational parameters comprising a sensor unit secured to the non-rotating ring and supporting a sensor element, and a rotary encoder member forming, with the rotating ring, a rotating part, the encoder member comprising an active part rotating past the sensor element, the sensor unit and the non-rotating ring forming a stationary part. The rotating part comprises an indexing means external to the active part of the encoder member and capable of angularly positioning said rotating part with respect to a reference of the stationary part in a position in which the encoder generates a reference signal in the sensor element.

"External" is to be understood here as meaning separate.

Thus, the motor manufacturer need now concern himself only with the angular orientation of the rotor with respect to the stator, all the other angular indexing operations being performed by direct mechanical means.

In one embodiment of the invention, the indexing means is supported by an intermediate part secured to the rotating part.

Advantageously, the intermediate part is a sleeve secured to the rotating ring.

In one embodiment of the invention, the sleeve is removable from the rotating ring.

In another embodiment of the invention, the indexing means is formed directly on the rotating ring, or on the encoder member.

Advantageously, the indexing means consists of a protrusion, a groove, a notch or an optical mark.

In one embodiment of the invention, a terminal for leading wires out of the sensor unit comprises the reference of the stationary part used for the angular positioning of the means of indexing of the rotating part.

In one embodiment of the invention, the indexing means and a terminal for leading wires out of the sensor unit are aligned when the encoder delivers the reference signal in the sensor.

As a preference, the encoder, for example its annular support, is provided with an angular indexing means capable of collaborating with a manufacturing tool, such as a mold. The indexing means may be a notch.

In one embodiment of the invention, the indexing means also forms a reference means when producing the active part of the encoder.

The present invention also proposes a method of pre-indexing a device as described hereinabove, in which method the rotating part is rotated until the reference signal is delivered, the two parts, rotating and stationary, are immobilized in this relative angular position, and an indexing means is placed on the rotating part in a given angular position with respect to a reference of the stationary part.

In the case of an instrumented rolling bearing mounted in a synchronous motor, precise angular indexing of the sensor with respect to an element of the casing whose angular position with respect to the stator is known makes it possible, if the encoder is itself indexed with respect to the shaft and with respect to the poles of the rotor, to determine the angular position of the rotor with respect to the stator and therefore the relative position of the poles. The sensor-encoder assembly can furthermore deliver information relating to the speed and to the acceleration of the rotor.

The invention also proposes a method in which the encoder support is positioned angularly in a mold and the active part is magnetized while it is being overmolded.

Alternatively, it is also possible for the encoder to be positioned angularly with respect to a magnetizing system, and then for the active part to be magnetized. In both cases, the poles will still arranged in a repeatable way with respect to an indexing means.

The present invention will be better understood and further advantages will become apparent from reading the detailed description of a number of embodiments taken by way of nonlimiting examples and illustrated by the appended drawings, in which:

FIG. 1 is a view in axial section of an instrumented rolling bearing according to a first embodiment of the invention;

FIG. 2 is a front elevation of the rolling bearing of FIG. 1;

Figure 3:
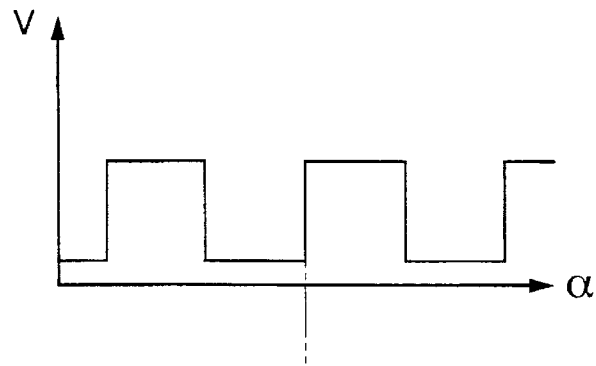
FIG. 3 is a curve showing the shape of the signal generated by the sensor (voltage V as a function of the angular displacement a) and the part of the signal taken as a reference signal.

As can be seen in FIGS. 1, 2 and 8 to 10, a rolling bearing 1 comprises an outer ring 2 provided with a raceway 3, an inner ring 4 provided with a raceway 5, a row of rolling elements 6, in this instance balls, arranged between the raceways 3 and 5, a cage 7 for maintaining the circumferential spacing of the rolling elements 6 and a seal 8 mounted on the outer ring 2 and coming into rubbing contact with a bearing surface of the inner ring 4 while at the same time being arranged radially between said two rings 2, 4 and axially between the row of rolling elements 6 and one of the lateral surfaces of said rings 2, 4. The seal 8 is mounted in a groove 9 formed in the outer ring 2 near its radial lateral surface 2a.

On the opposite side, the outer ring 2 is also provided with a groove 10 symmetric with the groove 9 with respect to a plane passing through the center of the rolling elements 6. A sensor unit referenced 11 in its entirety is mounted on the outer ring 2 on the same side as the groove 10. The sensor unit 11 comprises a metal support 12, a metal wall 13 and a sensor element 14 embedded in a central part made of synthetic material 15.

The metal support 12, of annular overall shape, comprises a radial wall in contact with the radial surface 2b of the outer ring 2 located on the same side as the groove 10 and extending on its interior edge via a rim 12b which is bent into the groove 10 and attaches the support 12 to the outer ring 2. The metal support 12 also comprises a cylindrical part 12c extending from the exterior edge of the radial part 12a axially away from the rolling bearing and ending in a rim bent inward at a slight angle.

The metal wall 13 is in the form of a disk, the exterior edge of which is of roughly the same diameter as the outside diameter of the outer ring 2 and the interior edge of which is of roughly the same diameter as the outside diameter of the inner ring 4. The wall 13 forms the envelope of the sensor unit 11 on the opposite side to the rolling bearing 1 and protects it against any possible impact or other mechanical attack. The wall 13 is limited in its axial movement in a direction away from the bearing 1 by the obliquely bent end rim of the cylindrical part 12c and, in the other direction, toward the bearing 1, by the central part 15 which is arranged axially between the radial part 12a and the wall 13.

The central part 15 is limited radially by the cylindrical part 12c toward the outside and has a bore 15a of a diameter that exceeds that of the imaginary circle defined by the centers of the rolling elements 6, so that sufficient radial space is left for the encoder which will be explained later on. The sensor element 14 which is secured to the central part 15 lies flush with the bore 15a. The central part 15 comprises a terminal 19 for leading out wires 20 projecting radially with respect to the cylindrical part 12c via an opening formed therein. The terminal 19 extends radially beyond the outside surface of the outer ring 2.

An encoder 16 comprises an annular support 17 with a T-shaped cross section with a radial branch 17a in contact with a radial surface 4b of the inner ring 4 lying in the same plane as the radial surface 2b of the outer ring 2, and a cylindrical branch 17b extending from the outside edge of the radial branch 17a, while at the same time being partially pushed onto an exterior cylindrical bearing surface of the inner ring 4, adjacent to the radial surface 4b. The cylindrical branch 17b projects partially axially outside the rolling bearing 1, more precisely beyond the plane of the surfaces 2b and 4b.

The encoder 16 also comprises an active part 18 of annular shape with a generally rectangular cross section arranged on the outside periphery of the cylindrical branch 17b and extending into close proximity to the bore 15a of the central part 15 with which it forms a radial gap. A narrow passage guaranteeing the sealing of the bearing is formed between the outside radial wall of the active part 18 and a thin portion of the central part 15 which is extended along the wall 13 thus defining a narrow radial passage. As the inner ring 4 rotates with respect to the outer ring 2, the active part 18 of the encoder 16 defines in rotating past the sensor element 14 which is capable at output of supplying an electrical signal which may have the shape of the curve illustrated in FIG. 3. Specifically, the active part 18 of the encoder 16 is a multipole magnetized ring. The number of poles in the active part 18 will be chosen to be a multiple of the number of poles of the motor in which the rolling bearing 1 is to be mounted.

A sleeve 21 of tubular overall shape is pushed into the bore 4c of the inner ring 4. The sleeve 21 is longer than the inner ring 4 in the axial direction and on that part of its exterior surface which is not arranged inside the inner ring 4 has a radial protrusion 22 extending parallel to the axis of the rolling bearing and forming an index allowing angular identification of the sleeve and therefore of the rotating part formed of the inner ring 4 in which it is fitted, and of the encoder 16. This mechanical index is used to pre-index the encoder 16 with respect to the sensor 14. All that is required for this is to look for the relative angular position of the rotating inner ring with respect to the outer ring 2 which corresponds to a reference signal, for example to a rising edge of the signal as shown by the arrow in FIG. 3, which will be made to correspond later to characteristic relative angular positions of the rotor with respect to the stator, for example the poles of the rotor facing the poles of the stator.

When this position is reached, the rings 2, 4 of the rolling bearing are held in said relative angular position and the sleeve 21 is pushed into the bore of the rolling bearing tightly so that the mechanical index of the sleeve 21 is angularly aligned on the terminal 19 for leading wires out of the sensor which constitutes the reference of the stationary part of the device which is formed by the outer ring 2 and the sensor unit 11. Once the sleeve 20 is in place, the inner ring 4 can be rotated to no disadvantage because one can be certain later of finding again later the relative angular position of the rings 2 and 4 corresponding to the emission of the reference signal by angularly aligning the protrusion 21 forming the index and the terminal 19 for leading out wires 20. The instrumented rolling-bearing device can thus be transported and handled in complete safety.

Figure 4:
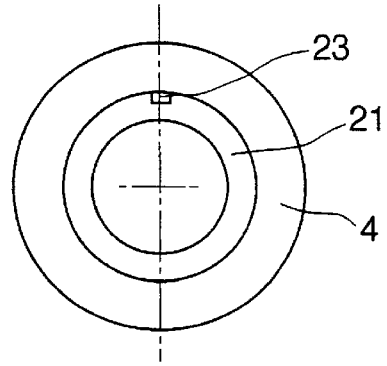
FIGS. 4 to 6 are partial front elevations of instrumented rolling bearings according to three other embodiments of the invention.
Figure 5:
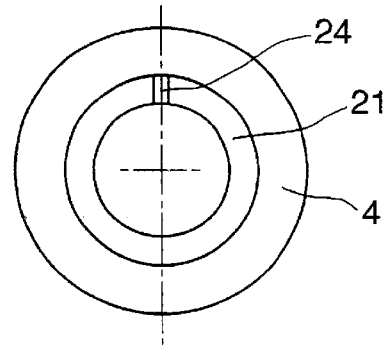
Figure 6:
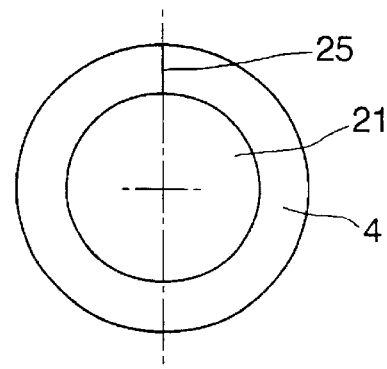

Of course other types of mechanical index such as an axial groove 23 formed on the periphery of the sleeve 21 and extending on the entire length thereof, namely the embodiment illustrated in FIG. 4, or alternatively a notch 24 formed on the end of the sleeve 21, namely the embodiment illustrated in FIG. 5, may be provided. It is also possible to envisage a mechanical or optical index arranged on the rotating ring of the bearing or alternatively on the annular encoder. The embodiment of FIG. 6 shows an optical index formed by a radial line 25 marked on the face of the rotating inner ring 4 of the bearing 1.

Figure 7:
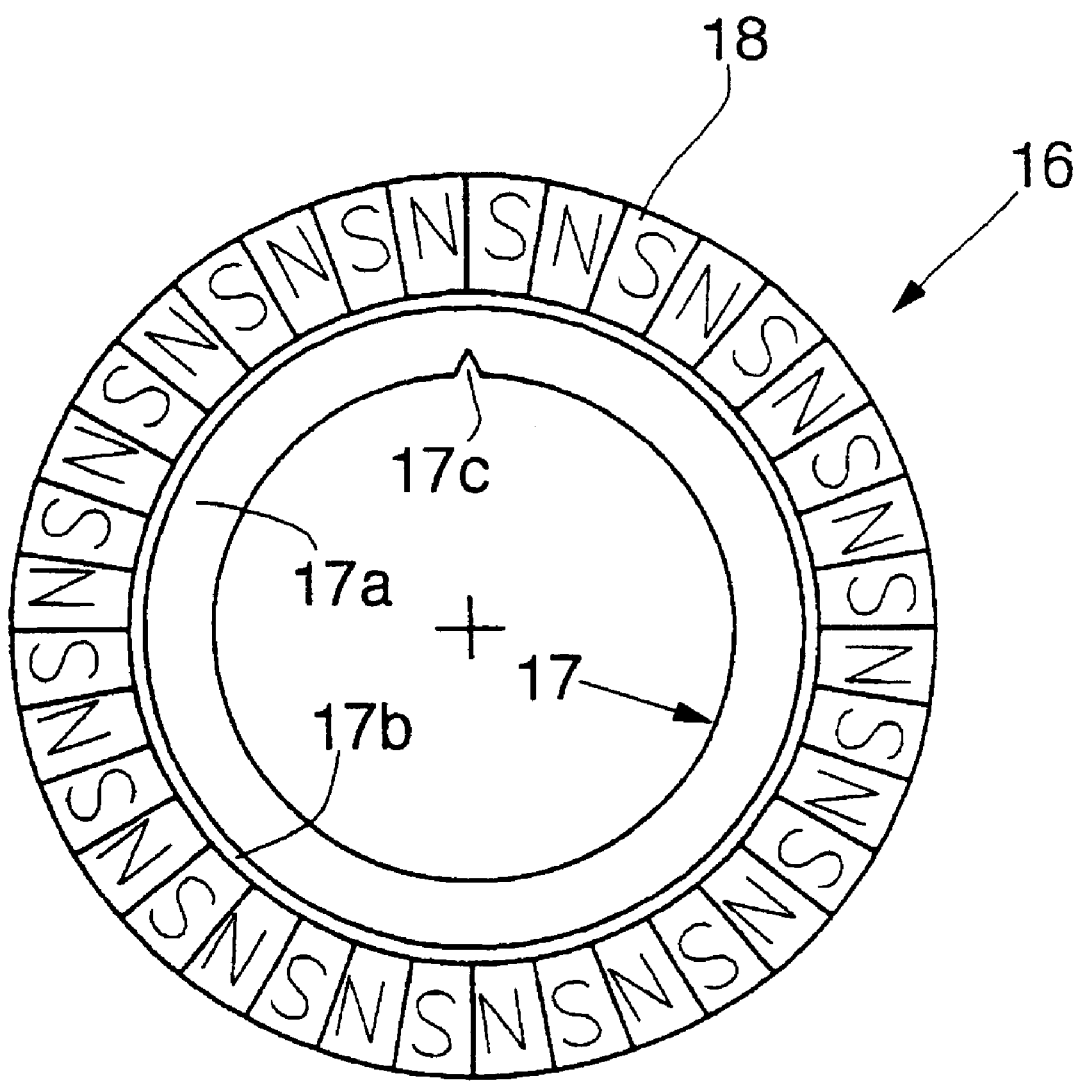
FIG. 7 is a front elevation of an encoder.

FIG. 7 shows an embodiment in which the active part 18 of the encoder consists of a multipole annulus made of plasto-ferrite, said annulus being supported by an annular support 17 the general shape of which is similar to that of FIG. 1. The index consists of a notch 17c formed on the interior edge of the radial portion 17a of the support.

Advantageously, this notch may also serve as a reference for magnetizing the poles. Thus, if the poles of the active part of the plasto-ferrite annulus are magnetized during the overmolding of said active part onto the support (in-mold magnetization), the annular support 17 of the encoder is positioned angularly in the mold using the index 17c, so that the poles are always magnetized in the same way with respect to said reference index of the annular support, that is to say so that the poles are always arranged angularly in the same way with respect to the reference index.

The same is true if magnetization is performed after the overmolding operation. In this case too, the notch forming the index may usefully serve to place the annular support in the magnetization device in such a way that on all encoders thus produced, the poles are always arranged angularly in the same way with respect to the reference index.

In the same way, in the case of an optical annular encoder the active part of which comprises a number of graduations intended to generate variations in intensity of a light beam bound for a sensor, it would be possible to envisage the same index being used both as a reference for producing the graduations and as a means of indexing the encoder in the rolling bearing.

Figure 8:
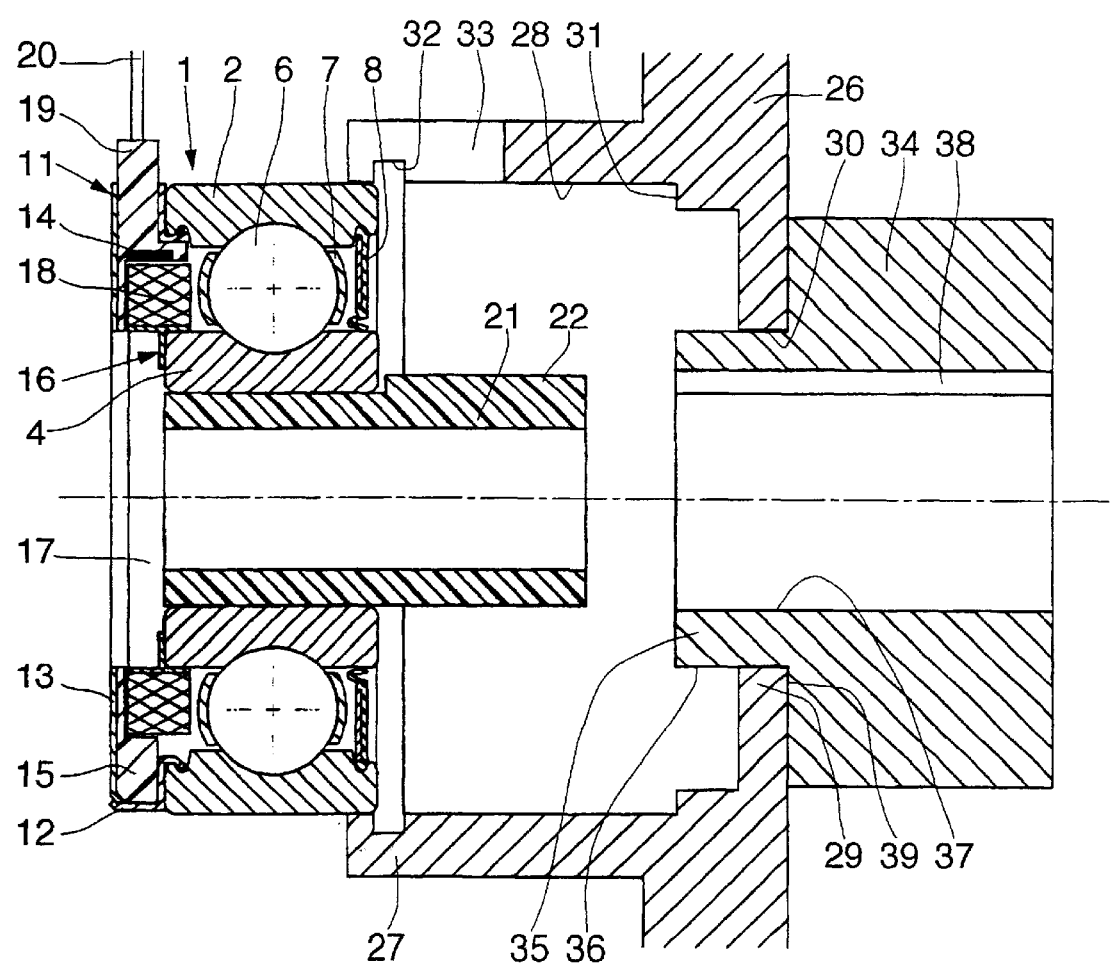
FIGS. 8 to 10 are views in axial section of the rolling bearing according to the first embodiment of the invention, showing the steps of assembly.
Figure 9:
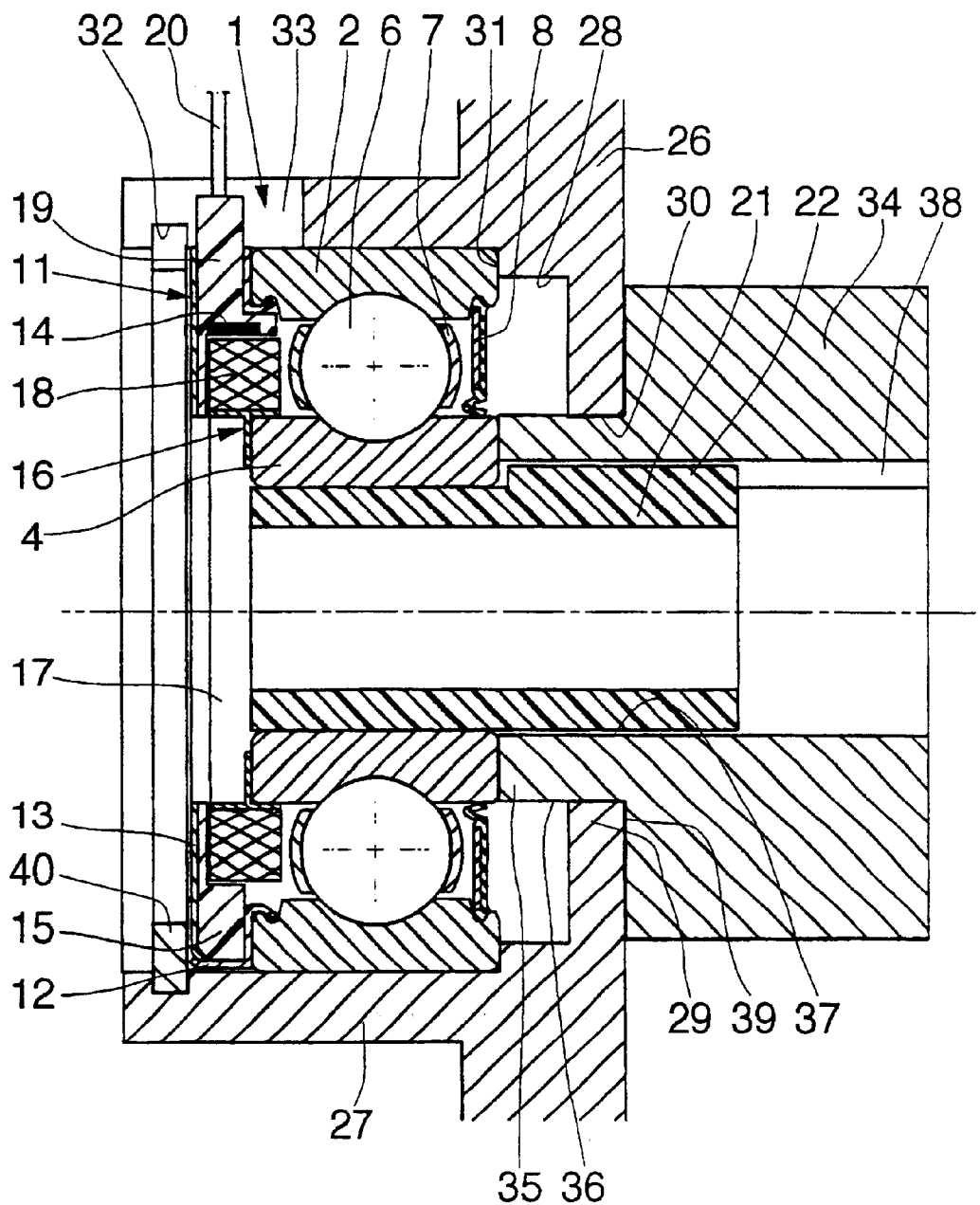
Figure 10:
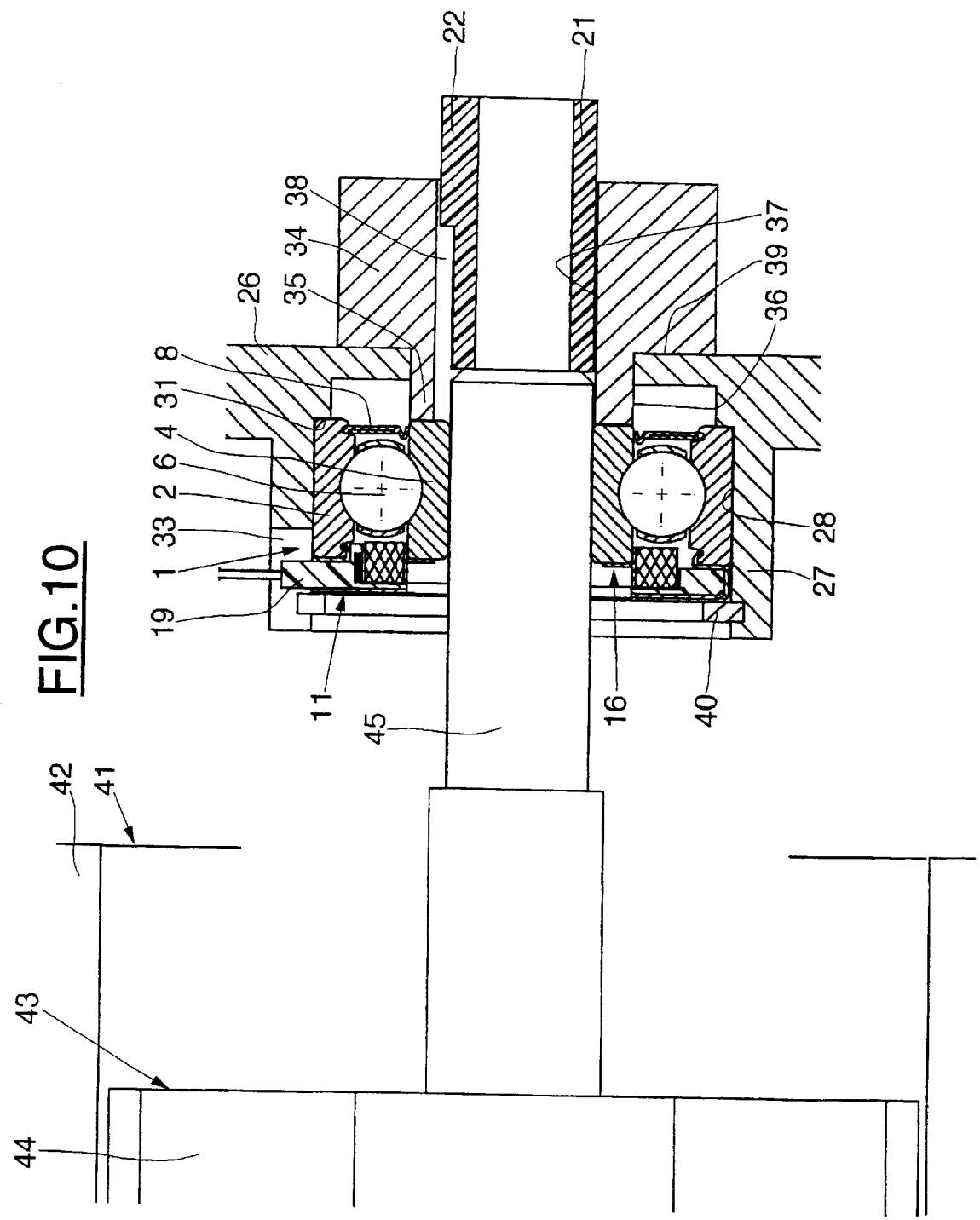

The mounting of the instrumented rolling bearing in an electric motor is illustrated, by way of example, by FIGS. 8 to 10.

In a first step, illustrated in FIG. 8, the bearing 1 equipped with its sleeve 21 is offered up to the entrance of a motor casing 26 comprising a cylindrical part 27 provided with a bore 28, and with a radial part 29 in the form of a disk provided with a bore 30 and partially closing off the interior space formed by the bore 28, the bores 28 and 30 being coaxial. A shoulder 31 is formed on the bore 28 near the radial part 29. The radial part 29 is arranged at the axial end of the cylindrical part 27, the other end of which is open and comprises an annular groove 32 extending outward from the bore 28 over part of the thickness of the cylindrical part 27. A notch 33 is formed through the entire thickness of the cylindrical part 27 and extends axially between said opposite end to the radial part 29 as far as beyond the groove 32.

An indexing tool 34 comprises an axial protrusion 35 of cylindrical overall shape provided with an exterior surface 36 of a diameter designed to fit into the bore 30 of the radial part 29 of the casing 26, and a bore 37 with a diameter identical to the bore 4c of the inner ring 4 of the bearing 1. Formed in the bore 37 is an axial groove 38 of dimensions designed for the protrusion 22 of the sleeve 21. The indexing tool 34 comprises a radial surface 39 extending outward from the protrusion 35 and able to come into abutment contact with a surface of the radial part 29 on the opposite side to the cylindrical part 27. The indexing tool 34 is thus fitted into the bore 30, its protrusion 35 projecting partially axially beyond the radial part 29 roughly as far as the shoulder 31.

When the indexing tool 34 is being pushed into the motor casing 26, the groove 38 of the indexing tool 34 is aligned angularly with the notch 33 of the motor casing 26. The bearing 1 is then offered up to the open side of the bore 28 with the sleeve 21 projecting axially toward the indexing tool 34. Using an axial movement, the bearing 1 is inserted in the bore 28, with the wire lead-out terminal 19 which projects radially from the bearing 1 arranged in the notch 33. At the same time, the end of the sleeve 21 which projects axially form the bearing, enters the bore 37 of the indexing tool 34 with the protrusion 22 projecting into the groove 38.

At the end of the axial movement of the bearing 1, the position is the one illustrated in FIG. 9, with the radial surface 2a of the outer ring 2 of the bearing 1 in abutment contact with the shoulder 31, and the radial surface 4a of the inner ring 4 in contact with the free end of the axial protrusion 35 of the indexing tool 34. Of course, if the axial dimensions of the outer ring 2 and inner ring 4 differed and therefore the radial surfaces 2a and 4a lay in different planes, a shoulder 31 and an end of the axial protrusion 35 also arranged in different planes would be envisaged. An elastic ring 40 for example of the circlip type, is arranged in the groove 32 and prevents any opposite axial movement of the bearing 1. The elastic ring 40 is in axial contact with the wall 13 of the sensor unit 11. Thus, the non-rotating part of the bearing 1, namely the outer ring 2 and the encoder element 11, are angularly indexed with respect to the motor casing 26 by virtue of the collaboration between the wire lead-out terminal 19 and the notch 33.

The casing 26 and the indexing tool 34 are angularly indexed by angular alignment of the groove 38 with the notch 33 during the push-fitting operation. The sleeve 21 is angularly indexed with respect to the indexing tool 34 by the collaboration of the protrusion 22 and of the groove 38 and the rotating part of the bearing 1 formed by the inner ring 4 and the encoder 18 is angularly indexed with respect to the sleeve 21 during the push-fitting of said sleeve. As the relative angular position of the casing 26 with respect to the stator 41 of the electric motor is known, the sensor and the encoder have thus been indexed with respect to the poles 42.

The electric motor also comprises a rotor 43 comprising poles 44 and a shaft 45 which is pushed with an axial movement into the bore 4c of the inner ring 4 of the bearing 1. The shaft 45 therefore axially pushes the sleeve 21 toward the outside, in other words on the same side as the indexing tool 34. Throughout the movement of push-fitting the shaft 45, the sleeve 21 continues to index the angular position, the protrusion 22 sliding axially in the groove 38. At the end of the movement, the sleeve 21 is no longer in contact with the inner ring 4 and the sleeve 21 and the indexing tool 34 are removed and can then be re-used, see FIG. 10.

In this way, precise angular positioning between the rotor 43 and the stator 41 is achieved. To start off with, the rotating and non-rotating parts of the bearing 1 are angularly indexed by looking for a relative position which corresponds to a reference signal. The sleeve is then pushed in, causing the angular positions of its mechanical index and of the terminal for leading out the wires from the sensor to correspond. The bearing provided with its sleeve is then mounted in the casing provided with the indexing tool with the wire lead-out terminal projecting into the notch of the casing and the index of the sleeve collaborating with a corresponding means belonging to the indexing tool. The rotor of the motor is then mounted, gradually driving out the sleeve 21 by translation inside the indexing tool and the sleeve and the indexing tool are removed. As the poles of the rotor have already been oriented with respect to those of the stator, the entire indexing sequence has thus been performed. A known angular position of the poles of the rotor with respect to those of the stator will correspond to the reference signal generated by the instrumented bearing. In this case, the reference signal will be produced when the poles of the rotor face those of the stator.

By virtue of the invention, the electric motor manufacturer need concern himself only with the angular orientation of the stator with respect to the rotor, all the other angular indexing operations being performed by direct mechanical means.

This exemplary embodiment applies, for example, to an electric motor, particularly of the synchronous type, but is nonlimiting. The indexing means that have been explained can apply to rolling bearings intended for various applications, and in which there is a desire to determine not only the rotational speed of a rotating part with respect to a stationary part, but also its precise angular position.

What is claimed is:

1. An instrumented rolling-bearing device, of the type comprising an outer ring, an inner ring, at least one row of rolling elements which are arranged between a raceway of the outer ring and a raceway of the inner ring, and an assembly for detecting rotational parameters comprising a sensor unit secured to the non-rotating ring and supporting a sensor element, and a rotary encoder member forming, with the rotating ring, a rotating part, the encoder member comprising an active part rotating past the sensor element, the sensor unit and the non-rotating ring forming a stationary part, wherein the rotating part comprises an indexing means external to the active part of the encoder member and capable of angularly positioning said rotating part with respect to a reference of the stationary part in a position in which the encoder generates a reference signal in the sensor element.

2. The device as claimed in claim 1, wherein the indexing means is supported by an intermediate part secured to the rotating part.

3. The device as claimed in claim 2, wherein the intermediate part is a sleeve secured to the rotating ring.

4. The device as claimed in claim 3, wherein the sleeve is removable from the rotating ring.

5. The device as claimed in claim 1, wherein the indexing means is formed directly on the rotating ring.

6. The device as claimed in claim 1, wherein the indexing means is formed directly on the encoder member.

7. The device as claimed in claim 1, wherein the indexing means consists of a protrusion, a groove, a notch or an optical mark.

8. The device as claimed in claim 1, wherein a terminal for leading wires out of the sensor unit comprises the reference of the stationary part used for the angular positioning of the means of indexing of the rotating part.

9. The device as claimed in claim 1, wherein the indexing means and a terminal for leading wires out of the sensor unit are aligned when the encoder delivers the reference signal in the sensor.

10. The device as claimed in claim 1, wherein the indexing means also forms a reference means when producing the active part of the encoder.

11. A method of pre-indexing a device as claimed in claim 1, wherein the rotating part is rotated until the reference signal is delivered, in that the two parts, rotating and stationary, are immobilized in this relative angular position, and in that an indexing means is placed on the rotating part in a given angular position with respect to a reference of the stationary part.

* * * * *